Figure 1:
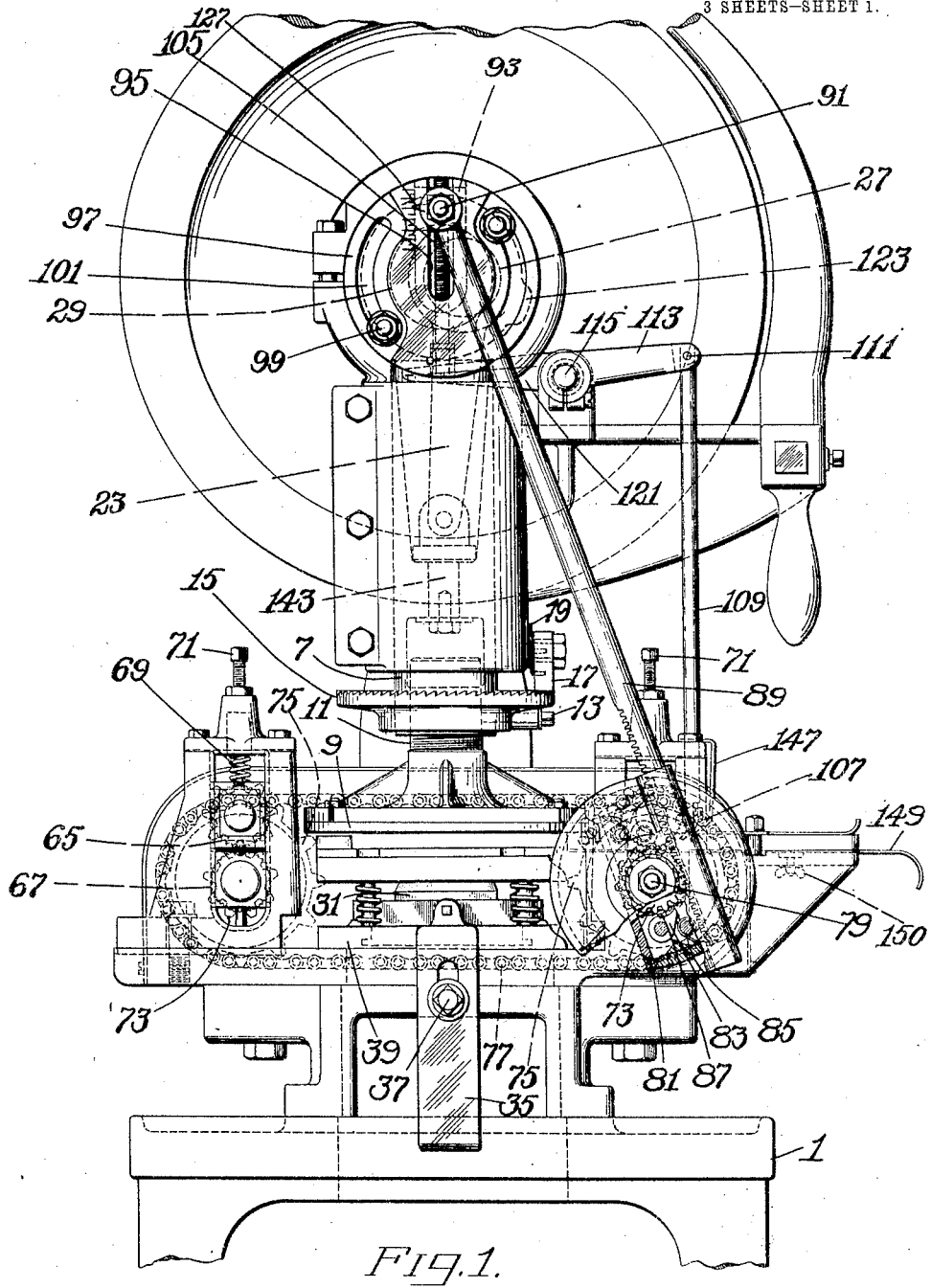

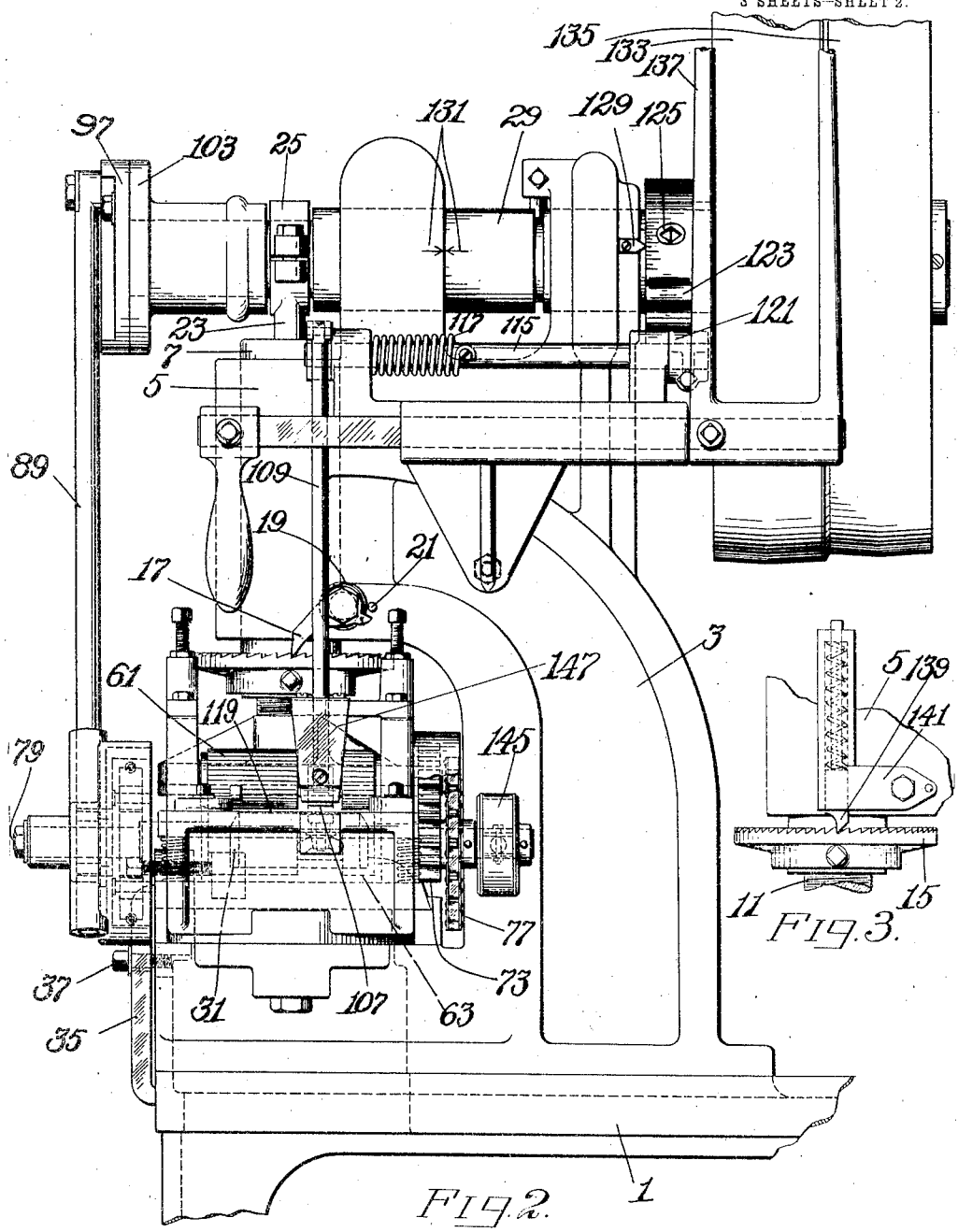

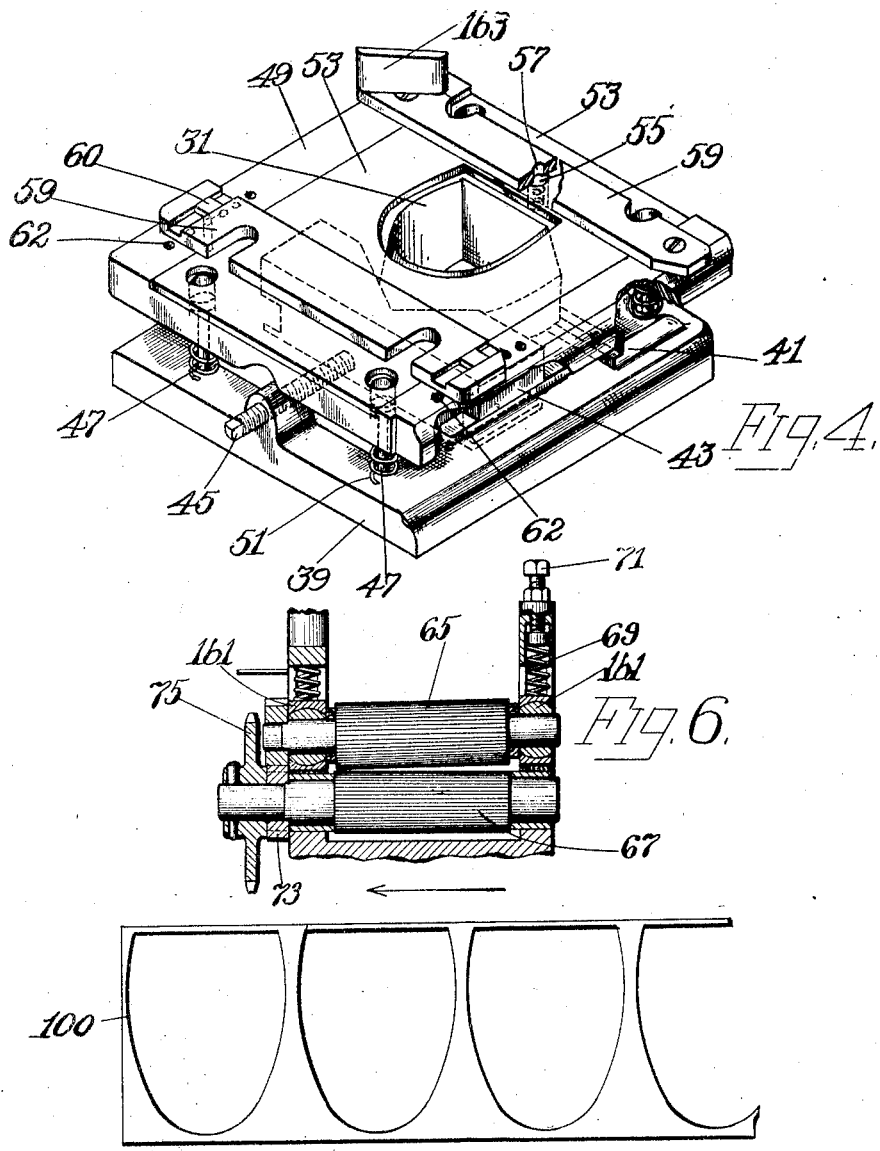

UNITED STATES PATENT OFFICE.

RALPH C. SIMMONS, OF BEVERLY, MASSACHUSETTS, ASSIGNOR TO UNITED SHOE MACHINERY COMPANY, OF PATERSON, NEW JERSEY, A CORPORATION OF NEW JERSEY.

CUTTING-MACHINE.

1,113,699.

Specification of Letters Patent.

Patented Oct. 13, 1914.

Application filed December 21, 1912. Serial No. 738,026.

*To all whom it may concern:*

Be it known that I, RALPH C. SIMMONS, a citizen of the United States, residing at Beverly, in the county of Essex and State of Massachusetts, have invented certain Improvements in Cutting-Machines, of which the following description, in connection with the accompanying drawings, is a specification, like reference characters on the drawings indicating like parts in the several figures.

This invention relates to machines for operating upon leather and similar material and is herein illustrated as embodied in a machine for dieing out of a strip of stock a series of blanks.

In the manufacture of heels for boots and shoes it has been customary to die out the lifts by moving a strip of material intermittently by hand over a stationary hollow die and striking the material with a mallet during its periods of rest so as to cut out a series of lifts and force them successively into and through the die; and the general object of the present invention is to accomplish this and similar operations automatically and in a manner to economize material.

The leather-board or other material from which the lifts are cut is commonly prepared in the form of strips of a width slightly greater than the length of the lifts which are subsequently to be died out. The lifts of a given size, however, differ from those of another size not only in length but in width so that the distance through which the material is fed between the cutting operations should vary according to the size of the die which is being used. Aside, however, from the different spacing which is thus required when dies of different sizes are being used, the distance through which the stock is advanced before the first blank is cut out or the position of the die should also be capable of variation in order that the first cut may produce a complete blank and may at the same time be located as close as possible to the forward edge of the strip so as to leave a minimum of waste.

Accordingly one feature of the present invention consists of a tool past which a piece of material is fed, means for causing said tool to operate upon said piece at intervals, and means for predetermining the location of the first operation of the tool with respect to the forward edge of the piece. This and other features of the invention including certain details of construction and combinations of parts will be set forth in connection with an illustrative machine and pointed out in the appended claims.

Referring now to the accompanying drawings,—Figure 1 is a side elevation of a machine in which the present invention is embodied; Fig. 2 is a front elevation of the machine; Fig. 3 is a detail elevation showing a modified form of mechanism for controlling the angular movement of the cutting block; Fig. 4 is a perspective of the die holder and die; Fig. 5 is a plan of a portion of a strip of material as it appears after the lifts have been cut out; and Fig. 6 is an elevation of the rear set of feed rolls, a piece of wedge shaped stock being shown in place between them.

The base 1 of the machine is provided with an arm 3 having at its upper end a sleeve or bearing 5 in which is reciprocatingly mounted a plunger 7 having adjustably mounted in its lower end a cutting block 9. This block is fast to a stem 11 which is threaded into the plunger and extends into a recess formed in the lower end thereof, as shown in Fig. 1. The stem of the cutting block is held in position by a screw bolt 13 threaded through the wall of the plunger, said screw bolt serving also to clamp to said plunger a ratchet 15 having horizontally extending teeth. A short brass plug may be inserted, if desired, in front of the end of the screw bolt 13 so as to avoid injury to the threads on the stem 11. Pivotally mounted on the arm 3 is a pawl 17 (see Fig. 2) normally held with its point in lowermost position by a coiled spring 19, the downward movement of the pawl being limited by a tail which contacts with a stop pin 21 on the arm 3. When, therefore, the plunger 7 is reciprocated by means of a connecting rod 23 provided with a strap 25 which encircles an eccentrically located reduced portion 27 of the driving shaft 29, the cutting block together with the plunger is given at each reciprocation a partial rotation about the stud 143 to the head of which the connecting-rod 23 is pivotally connected.

The die 31 is mounted in a die holder which is supported beneath the cutting block on the frame of the machine and is held in place by a clamp 35 and a screw bolt 37. Referring now to Fig. 4 the die holder comprises a base 39 having a transversely extending bar or stop 41 between which and the clamping member 43 the die 31 is held, a screw 45 threaded through an ear on the base serving to advance said member. The base 39 carries four posts or guides 47 for the upper member 49 of the die holder, said posts being surrounded by coiled springs 51 which support the upper member 49 yieldingly. A stripper plate 53 slidably mounted on the member 49 and, extending beneath guide bars 59, is provided with an opening through which the die protrudes when said member and plate are depressed. The plate is locked in position by a spring-pressed pin 55 which may be depressed by inserting a slender tool in an aperture 57 of one of the guide bars 59 between which the strip of material is fed. It is thus possible to replace the plate with one having an opening of a different size when a larger or smaller die is to be used. One of the guide bars carries bolts 60 which may be inserted respectively in any one of a series of sockets 62 so as to accommodate strips of different width.

In the operation of the machine a strip of material is fed past the die intermittently, and there is cut from it a series of lifts, the waste material, after the lifts have been removed, having the appearance indicated in Fig. 5. In order to feed the strip through the machine two pairs of feed rolls are provided, one at the front and the other at the rear of the machine. One of the front pair is shown in full lines in elevation in Fig. 2 at 61 and the other in dotted lines at 63. The rear pair are shown in Figs. 1 and 6 at 65 and 67. The shafts of the lower rolls of each pair are mounted in fixed bearings, and the shafts of the upper rolls of each pair in slidable bearings which are held down by springs 69 the tension of which may be varied by manipulating the screw bolts 71. The shafts of each pair are provided with intermeshing gears 73, and the two lower shafts have fast to them sprocket wheels 75 over which passes a chain 77. When, therefore, intermittent angular movement is imparted to the lower front roll in a manner presently to be described, all the rolls will be actuated, the strip of material fed to the die, and what remains of it fed out of the machine.

The shaft 79 of the lower front roll may be rotated intermittently by any suitable mechanism, and the particular intermittent grip device shown will, therefore, be described briefly. A pawl carrier 81 loose on the shaft 79 has pivotally mounted therein pawls 83 held by springs 85 against a ratchet wheel 87 which is fast to said shaft; and this pawl carrier is oscillated by means of a rack bar 89 having at its upper end an eye which encircles a crank pin 91. The pin is carried by a block 93 slidable in a groove 95 in a disk 97 which is adjustably fastened in place by means of screw bolts 99, said screw bolts passing through slots 101 in said disk and being threaded into a flanged sleeve 103 which is fast to the shaft 29.

With the construction thus far described, rotation of the shaft 29 will cause reciprocation of the plunger 7 and intermittent rotation of the two sets of feed rolls. By turning the screw 105, which is threaded through the block 93 but is held from longitudinal movement, said block may be adjusted to vary the location of the pin 91 and hence the extent of the intermittent feed movements. By loosening the screw bolts 99 the disk 97 may be adjusted angularly to vary the timing of the intermittent feed movements with respect to the reciprocation of the plunger.

In order to economize material a complete lift should be cut out in the first instance and should be cut from the most forward part of the strip practicable so as to leave the minimum waste. In Fig. 5 the arrow indicates the direction in which the stock was fed through the machine, and it should be noted that a complete lift was cut out in the first instance and that the first string 100 of waste material is as narrow as is practicable that it should be, it being understood that the strip of waste material should not be frail enough to be broken apart since it is then liable not to be fed properly from the machine.

With the construction of the machine thus far described, if a strip of material is fed to the forward rolls it will be fed over the die at the end of a series of intermittent feed movements, and thereafter a series of lifts will be cut from the strip. The location of the first cut of the die, however, will be haphazard, and considerable material will probably be wasted either by the cutting out of an incomplete lift in the first instance or by the locating of the first complete lift at too great a distance from the forward edge of the strip. In order to avoid the waste which occurs in either case and to insure that the forward end of the strip of stock shall be fed just over the die before the first cut takes place, provision is made for predetermining what portion of an intermittent feed movement shall be imparted to the strip of stock in the first instance. To this end a gate 107 is arranged to prevent the presentation of stock except at predetermined intervals. This gate has a stem 109 pivoted at 111 to an arm 113 carried by a rockshaft 115, said rockshaft being continually acted upon by a spring 117 in such a manner as to urge the gate downwardly toward the table 119 upon which the end of the strip is supported just prior to its presentation to the feed rolls. In order to raise the gate at intervals, a second arm 121 fast to the inner end of the rockshaft extends into the path of a cam 123 on a collar which is adjustably fastened to the driving shaft 29 by a set screw 125 having a socketed head to receive a square ended tool by which it may be tightened and loosened. By adjusting the block 93 so as to vary the throw of the rack bar 89 and consequently the extent of the intermittent feed movements, and by correspondingly adjusting the position of the cam collar so as properly to time the raising of the gate 107 the position occupied by the forward edge of the strip of material at the end of any given intermittent feed movement may be accurately predetermined.

In order to facilitate the adjustment of the block 93, said block carries a pointer 127 which moves over a scale; and in order to facilitate adjustment of the cam 123 a similar pointer 129 on a stationary bearing coöperates with a scale marked on the cam collar. It will be evident that the setting of the scale on the cam collar with respect to the pointer 129 will depend upon the angular position of the driving shaft 29, and consequently there are marked on said shaft and on a stationary bearing respectively two arrows 131 which are brought into alinement before the cam collar is adjusted. The adjustments described above are desirable by reason of the fact that dies of different sizes are made use of, and that it is desirable to locate the center of the die, of whatever size it may happen to be, beneath the center of the cutting block. The scales, therefore, will be correspondingly marked with numbers which indicate the width of the various dies which are to be used, so that, for example, when a die of a width of two inches is to be used, all that will be necessary to do will be to bring the pointers into register with the marks on the respective scales which are numbered 2. In case it is not thought necessary to maintain the die in the center of the cutting block, the same result may be secured by adjusting the die horizontally and clamping it in adjusted position by the clamp 35.

The driving shaft 29 is provided with the usual fast and loose pulleys 133, 135 from one to the other of which a belt may be transferred by a belt shifter 137. In order to prevent the feed rolls from overrunning at the end of the intermittent feed movement a friction brake 145 (Fig. 2) of any approved form may be caused to act continuously upon the shaft of the lower forward feed roll. A stationary guard or guide 147 is located in front of the gate 107 having an inturned lower end to guard the fingers of the operator and to guide the end of the strip of material. The gate 107 also has an inturned lower end, and the rolls adjacent to it are cut away to make room for said gate and to permit the forward end of the strip of material to be moved in close to the bite of the rolls so that, upon the raising of the gate, the strip may be seized by the rolls almost instantly. A sliding support 149, which is adjustably held in place by a thumb screw 150, is rabbeted in the table and extends through to the die holder so as to prevent the forward end of the strip from curling downwardly.

The spring 117 which moves the gate downwardly is not of sufficient strength to interfere with the forward movement of the strip of material after it has been seized by the feed rolls but is of sufficient strength to prevent the strip from being pushed forward by hand. If, then, with one strip of material being fed through the machine an attempt is made to follow it immediately by a second strip, the forward end of which is in contact with the rear end of the first strip, the second strip will buckle and thus be prevented from entering between the rolls until, or unless, the gate has been automatically raised.

When stock which is wedge shaped in cross section is being operated upon it is necessary that the upper feed rolls be capable of tilting, and to this end the construction shown in Fig. 6 is provided. The shafts of the rolls are mounted in bearings 161 which are segments of spheres and hence permit the upper rolls to assume the position of the roll 65 in Fig. 6. When wedge shaped stock is fed to the machine the thick side is moved along adjacent to the left hand guide-bar 59 as viewed in Fig. 4 and the thin side adjacent to the right hand guide-bar 59. There is consequently a tendency for the strip of stock to be swung toward the right; and to prevent such swinging a guide 163 having an obliquely disposed face is mounted at the rear end of the right hand guide-bar 59, said guide tending to turn the strip of stock back into its proper path.

In Fig. 3 an alternative means for holding the ratchet 15 is illustrated comprising a spring-pressed pawl 139 mounted in a casing 141 which is fastened to the socket 5. With this form the plunger has no automatic angular movement but may be given such movement manually at occasional intervals while the machine is at rest.

The operation of the machine is as follows:—The various adjustments described above having been made, power is applied to the machine and a strip of material placed with its forward portion on the table 19 and its forward edge against the gate 107, the operator exerting pressure on the stock so that when the gate is momentarily lifted by the action of the cam 123 the forward edge of the stock will immediately be gripped by the feed rolls. The distance from the forward feed rolls to the die is greater than the extent of a single intermittent feed movement, and consequently a series of these movements is necessary before the material is in position to receive the first cut. By properly timing the raising of the gate 107 a predetermined portion of an intermittent feed movement may be imparted to the material in the first instance and thus the location of the forward end of the piece at the end of any given movement of a series may be predetermined. As the material comes to rest with its forward portion over the die, the plunger 7 descends thereby forcing the material down upon the die and depressing the upper member 49 of the die holder so that when the plunger is raised the material is stripped from the die. The material is then fed forward the extent of an intermittent feed movement, after which the same operation is repeated. The waste material, which has the general appearance shown in Fig. 5, is seized by the rear rolls and carried from the machine.

Although the invention has been set forth in connection with a particular machine it should be understood that the invention is not limited in the scope of its application to the particular machine shown and described.

Having thus described my invention, what I claim and desire to secure by Letters Patent of the United States is:—

1. A machine of the class described having, in combination, a tool past which a piece of material is fed, means for causing said tool to operate upon said piece at intervals, means for locating the first operation of the tool with respect to the piece, and means for controlling the presentation of said piece to said last mentioned means to vary said location.

2. A machine of the class described having, in combination, a tool for operating upon a piece of material, intermittently operated feed mechanism having a given extent of movement for advancing the material to the tool in a series of steps, and means for controlling the presentation of the piece to said mechanism to determine the position occupied by the forward edge of the piece at the end of the first step of the series.

3. A machine of the class described having, in combination, a tool for operating upon a piece of material, intermittently operated feed mechanism having a given extent of movement for advancing the material to the tool in a series of steps, and means for predetermining that portion of one of the movements of the feed mechanism which shall be imparted to the piece.

4. A machine of the class described, having in combination, a tool for operating upon a piece of material, intermittently operated feed mechanism having a given extent of movement for advancing the material to the tool in a series of steps, and means for causing to be imparted to the piece a fractional part of one of the movements of the feed mechanism.

5. A machine of the class described having, in combination, a tool for operating upon a piece of material, intermittently operated feed mechanism having a given extent of movement for advancing the material to the tool in a series of steps, and means for controlling the presentation of the piece to said feed mechanism to determine the location of the first operation of the tool with respect to the forward edge of the material.

6. A machine of the class described having, in combination, a tool for operating upon a piece of material, intermittently operated feed mechanism having a given extent of intermittent movement for advancing the material to the tool in a series of steps, and means for predetermining that portion of the initial feed movement of said feed mechaism which shall be imparted to the material and thereby locating the first operation of the tool in a predetermined position with respect to said material.

7. A machine of the class described having, in combination, a tool for operating upon a piece of material, intermittently operated feed mechanism having a given extent of movement for advancing the material to the tool in a series of steps, said mechanism being located at a fixed distance from the operative position of the tool greater than the length of a single feed movement, and means for predetermining that portion of the initial feed movement of said feed mechanism which shall be imparted to the piece.

8. A machine of the class described having, in combination, a tool for operating upon a piece of material, intermittently operated feed mechanism for advancing the material to the tool, means for varying the extent of the individual feed movements to space the successive locations of the operations of the tool with respect to the material, and means for predetermining that portion of the initial feed movement of said feed mechanism which shall be imparted to the material and thereby locating the first operation of the tool thereon.

9. A machine of the class described having, in combination, mechanism for cutting a blank from a piece of material, mechanism for feeding said piece intermittently to said cutting mechanism, the mechanisms being so timed that a complete blank will be cut from the piece in the first instance if a given portion of one of the intermittent feed movements is imparted to the piece in the first instance, and means for insuring that such portion shall be imparted.

10. A machine of the class described having, in combination, a die, a block, means for causing relative movement of said die and block to cut a blank from a piece of material, means for imparting to said piece a series of intermittent feed movements to advance the piece into position to be operated upon, and means for predetermining what portion of the feed movement shall be imparted to the piece in the first instance.

11. A machine of the class described having, in combination, a die, a block, means for causing relative movement of said die and block to cut a blank from a piece of material, means for imparting to said piece an intermittent feed movement to feed it between said die and block, and intermittently operated means for temporarily preventing said piece from being presented to said feeding means while said means is operating.

12. A machine of the class described having, in combination, a die, a block, means for causing relative movement of said die and block to cut a blank from a piece of material, means for imparting to said piece an intermittent feed movement to feed it between said die and block, and intermittently operated means for insuring presentation of said piece to said feeding means when the die, block and feeding means are in a predetermined relation to one another.

13. A machine of the class described having, in combination, a die, a block, means for causing relative movement of said die and block to cut a blank from a piece of material, intermittently operated feed rolls for advancing said piece, a gate, and means for raising said gate at a predetermined point in the movement of said rolls.

14. A machine of the class described having, in combination, a die, a block, means for causing relative movement of said die and block to cut a blank from a piece of material, intermittently operated feed rolls for advancing said piece, one of said rolls having a cut away portion, a gate extending into the space thus provided, and means for raising said gate at a predetermined point in the movement of said rolls.

15. A machine of the class described having, in combination, a die, a block, means for causing relative reciprocating movement of said die and block to cut a blank from a piece of material, intermittently operated feed mechanism for advancing said material into position to be operated upon, and automatic means for timing the beginning of the intermittent feed movements of the material with respect to the relative reciprocating movement of the die and block.

16. A machine of the class described having, in combination, a die, a block, means for causing relative reciprocating movement of said die and block to cut a blank from a piece of material, means for feeding the material into position to be operated upon, an intermittently operated gate for controlling the presentation of the material to the feed mechanism, and means for timing the operation of the gate with respect to the relative reciprocation of the die and block.

17. A machine of the class described having, in combination, a die, a block, means for causing relative movement of said die and block to cut a blank from a piece of material, intermittently operated feed mechanism for advancing the material, an intermittently operated gate for controlling the time of presentation of said material to said feed mechanism, and means for varying the extent of the intermittent feed movements.

18. A machine of the class described having, in combination, a die, a block, means for causing relative movement of said die and block to cut a blank from a piece of material, intermittently operated feed mechanism for advancing the material, an intermittently operated gate for controlling the time of presentation of said material to said feed mechanism, and means for varying the time of actuation of said gate.

19. A machine of the class described having, in combination, a die, a block, means for causing relative movement of said die and block to cut a blank from a piece of material, intermittently operated feed mechanism for advancing the material, an intermittently operated gate for controlling the time of presentation of said material to said feed mechanism, means for varying the extent of the intermittent feed movements, and means for varying the time of actuation of said gate.

20. A machine of the class described having, in combination, a die, a block, means for causing relative movement of said die and block to cut a blank from a piece of material, means for feeding the material into position to be cut, a gate for controlling the presentation of the material to the feeding means, a spring for closing the gate, and a cam for opening the gate intermittently in opposition to the force of the spring.

21. A machine of the class described having, in combination, a die member, a cutting block member, a means for causing relative movement between said members to cut a blank from a piece of material, a ratchet fast to one of said members, and a pawl yieldingly held in position to engage said ratchet intermittently on the relative movement of said members.

22. A machine of the class described having, in combination, a die member, a cutting block member, means for causing relative movement between said members to cut a blank from a piece of material, a ratchet fast to one of said members, and a pawl pivotally mounted on the frame of the machine in position to engage the ratchet intermittently on the relative movement of said members.

23. A machine of the class described having, in combination, a die, a cutting block, means for reciprocating said block to press a piece of material against said die, a ratchet fast to said block, and a pawl pivotally mounted on the frame of the machine and having its operative end located in the path of reciprocation of said ratchet.

24. A machine of the class described having, in combination, a die, a cutting block, means for reciprocating said block to press a piece of material against said die, a ratchet fast to said block, a pawl pivotally mounted on the frame of the machine and having its operative end located in the path of reciprocation of said ratchet, and a spring constructed and arranged to hold the point of said pawl toward said ratchet.

25. A machine of the class described having, in combination, mechanism for cutting a blank from a piece of material, mechanism for feeding intermittently to the cutting mechanism the piece of material whereby the forward edge of the hole produced by cutting out the first blank is located a given distance from the forward edge of the stock, and means for varying the extent of one of the intermittent feed movements of the material with reference to other movements thereof to vary said distance.

26. A die holder for a machine of the class described comprising a base, an upper member, springs between said base and member, a stripper plate slidably and detachably mounted in said member, and clamping means carried by said base for holding the die in position.

27. A die holder for a machine of the class described comprising a base, an upper member, springs between said base and member, a stripper plate slidably mounted in said member, guides between which a strip of material may be fed, one of said guides being adjustable to accommodate strips of different widths and clamping means carried by said base for holding the die in position.

28. A machine of the class described having, in combination, a tool, mechanism for feeding work to be operated upon by said tool into operative relation to said tool in a series of uniform steps, and means acting automatically to control the presentation of the work to said feeding mechanism in such manner that only a predetermined part of the normal feeding movement of said mechanism is effective upon the work during the initial feeding step.

29. A machine of the class described having, in combination, a tool for operating upon a piece of material, intermittently operating feed mechanism having a given extent of movement for advancing the material to the tool in a series of steps, and automatic means for varying relatively the extent of movement of the feed mechanism which is effective to advance the material during one of the steps of the series.

30. A machine of the class described having, in combination, a die and a die block relatively movable to effect a cutting operation, intermittently operated mechanism for feeding a strip of stock in a series of steps into operative relation to said die and block, and means for automatically effecting a relative variation in the extent of effective feeding movement of said feeding mechanism for different steps of the series.

31. A machine of the class described having, in combination, a die and a die block relatively movable to effect a cutting operation, intermittently operated mechanism for feeding a strip of stock by successive steps into operative relation to said die and block and means for automatically effecting a variation of the initial effective feeding movement of said feeding mechanism adjustable to determine a definite location of the forward end of the strip with respect to the die.

32. A machine of the class described having, in combination, a die and a die block relatively movable to effect a cutting operation, intermittently operated feeding mechanism arranged to engage and feed a strip of stock in a stepwise manner into operative relation to said die, the extent of the effective feeding movement of said feeding mechanism being in proportion to the extent of the engagement of said mechanism with said stock, and means for automatically varying the amount of engagement of said feeding mechanism with the stock, said means being adjustable to determine a definite location of the forward end of the stock with respect to the die.

In testimony whereof I have signed my name to this specification in the presence of two subscribing witnesses.

RALPH C. SIMMONS.

Witnesses:
CHESTER E. ROGERS,
MABEL A. SWETT.